United States Patent [19]

Metabi

[11] Patent Number: 4,589,751
[45] Date of Patent: May 20, 1986

[54] ATTACHMENT DEVICE FOR INTERCHANGEABLE OPTICAL DEVICE

[75] Inventor: Tsuneyo Metabi, Sakai, Japan

[73] Assignee: Minolta Camera Kabushiki Kaisha, Osaka, Japan

[21] Appl. No.: 614,560

[22] Filed: May 29, 1984

[30] Foreign Application Priority Data

Jun. 1, 1983 [JP] Japan .............. 58-84222[U]

[51] Int. Cl.$^4$ .............................................. G03B 11/04
[52] U.S. Cl. ...................................... 354/295; 350/587
[58] Field of Search ............... 350/587; 354/274, 295, 354/286, 272

[56] References Cited

U.S. PATENT DOCUMENTS 3,620,149 11/1971 Ogihara ...................... 354/286
4,390,263 6/1983 Sumita ....................... 354/286

FOREIGN PATENT DOCUMENTS 939192 2/1956 Fed. Rep. of Germany ...... 350/587
55-130312 9/1980 Japan .

OTHER PUBLICATIONS

The Catalogue of Japan Camera Show vol. 72 (Sep., 1981) p. 44.

Primary Examiner—Michael L. Gellner
Attorney, Agent, or Firm—Watson, Cole, Grindle & Watson

[57] ABSTRACT

An attachment device, such as a protective cap, is attachable to an interchangeable lens that includes a diaphragm mechanism having a plurality of diaphragm blades overlapping one another to form a diaphragm and a diaphragm interlocked member interlocked with the diaphragm blades and urged for stopping down the diaphragm. The attachment device includes a diaphragm retaining member that drives the diaphragm interlocked member to a position to open the diaphragm larger than the minimum aperture, when the attachment device is attached to the interchangeable lens.

9 Claims, 13 Drawing Figures

ATTACHMENT DEVICE FOR INTERCHANGEABLE OPTICAL DEVICE

BACKGROUND OF THE INVENTION

1. Field of the Invention

The present invention relates to an attachment device for an interchangeable optical device with a diaphragm mechanism.

2. Description of the Prior Art

In a conventional interchangeable optical device, such as an interchangeable lens, which is detachably mounted on a camera and is provided with a plurality of diaphragm blades to be opened and stopped down, a diaphragm interlocked member is provided to open and stop-down the diaphragm in response to information from the camera, with the diaphragm interlocked member being linked with a driving member provided in the camera when the interchangeable optical device is coupled with the camera. In such an interchangeable optical device of the structure as mentioned above, the diaphragm interlocked member is urged in a direction to open the diaphragm (hereinafter called opening tendency) or in a direction to stop-down the diaphragm (hereinafter called stopping-down tendency). In the case of the interchangeable lens having an opening tendency the driving member in the camera pushes the diaphragm interlocked member against the urging force to stop down the diaphragm. In the case of an interchangeable lens with the stopping-down tendency, the driving member in the camera pushes the diaphragm interlocked member to open the diaphragm fully in a normal condition. For stopping-down of the diaphragm, the driving member moves in the direction to go away from the diaphragm interlocked member allowing the latter to follow the driving member by the urging force and stop-down.

FIG. 1 shows an interchangeable lens with the stopping-down tendency, and FIG. 2 shows a diaphragm mechanism with the stopping-down tendency, provided in the interchangeable lens illurated in FIG. 1. With reference to those Figures the rear side of the interchangeable lens is shown as in the right side in the Figures. FIGS. 3 and 5 are the front view of diaphragm blades, respectively. The diaphragm mechanism comprises six diaphragm blades 8 (only one of them shown in FIG. 2.), which are supported between a restraining plate 11 and a diaphragm operating plate 5. Also, each diaphragm blade 8 carries pins 9 and 10 which are vertically extending in opposite directions from both sides of the diaphragm blade 8 but not being aligned with each other. The first pin 9 is received in a diaphragm driving cam slot 7 formed on the diaphragm operating plate 5, and the second pin 10 is received in a small hole formed on the restraining plate 11. A diaphragm interlocked member 3 extends from the diaphragm operating plate to the back of the interchangeable lens (to the right in FIG. 1) with its end projecting from the back of the interchangeable lens, as shown in FIG. 1.

In this structure, the diaphragm interlocked member 3 and the diaphragm operating plate 5 are urged by a spring 6 as shown in the FIG. 2 to turn in the counterclockwise direction as viewed from the back of the interchangeable lens. When these members rotate under the force of the spring 6, diaphragm blades 8 will rotate counterclockwise about respective pins 10 to effect the stopping-down of the diaphragm.

When a male bayonet 2 of the interchangeable lens is fitted into a lens mount LM of a camera body CB and rotated clockwise relative to the camera body, the diaphragm interlocked member 3 will be brought into contact with a driving member DM of the camera body CB and moved in the clockwise direction as viewed from the rear of the lens to open the diaphragm fully.

When the diaphragm mechanism as described above is at the full open condition as illustrated in FIG. 3, only each adjacent two diaphragm blades overlap each other as seen in the cross-section in FIG. 4, so as not to interfere with one another. Conversely, when the diaphragm has been stopped down to the minimum aperture as shown in FIG. 5, more than three diaphragm blades overlap one another, engaging and interfering one another vigorously with the overlapping or engaging portions warping or curving. The smaller the minimum diaphragm aperture is, the more the blades interfere with one another.

When an interchangeable optical device having a diaphragm mechanism with the stopping-down tendency and a manual diaphragm setting means is detached from the camera with its diaphragm mechanism being preset to a minimum aperture, the diaphragm is stopped-down to and held at minimum aperture condition as shown in FIGS. 5 and 6. Thus, if the interchangeable optical device is kept in the detached condition for a long time, the diaphragm blades will become fatigued resulting in deformation of the blades. Also, vibrations caused while the interchangeable optical device set to the minimum aperture value is carried, may sometimes injure the diaphragm blades because of vigorous rubbing of the blades against one another. The rubbing of blades will also cause an anti-reflection paint coated on the surfaces of the diaphragm blades to come off little by little, so that the paint tips accumulate as dust inside the device. The deformation or injury of the diaphragm blades and the accumulation of the paint tips may cause malfunctions in diaphragm opening and stopping-down operation, resulting in incorrect diaphragm aperture size. Also, the damaged diaphragm blades may cause not only unexpected reflection of light at the injured surface but also adhesion of dust on the injured surface, resulting in deterioration of the optical performance of the device. These problems occur similarly in interchangeable optical devices having a diaphragm mechanism with the stopping-down tendency but having no manual diaphragm setting means. Consequently, it is desirable for the diaphragm to be kept open when not in use in the case of interchangeable optical devices having a diaphragm mechanism with the stopping-down tendency.

Japanese Utility Model laid-open Publication no. Sho 55-130312 discloses an interchangeable lens equipped with a means for opening the diaphragm when not in use. According to the Utility Model Publication, an interchangeable lens is provided with a cam member for determining the aperture size by controlling the amount of movement of the diaphragm blades. Besides an ordinary cam portion for setting the diaphragm aperture, the cam member is formed with an additional cam portion for opening the diaphragm larger than the minimum aperture when the interchangeable lens is detached from the camera body. Such interchangeable lens is designed such that it has a main body section, a mouth section, and a section including the cam member. The mounting and detaching of the interchangeable lens on and from the camera body can be performed by moving the main body section and the mount section relative to each other, and the section including the cam member is selectively coupled with one of the main body section and the mount section. When the interchangeable lens is mounted on the camera body, the section including the cam member is coupled through a clutch member to the main body section integrally therewith. At this time, a pin provided on the main body section enages the ordinary cam portion of the cam member to control the aperture. When the interchangeable lens is detached from the camera, the main body section is moved relative to the mount section. During this relative movement, the clutch member is switched such that the section including the cam member is connected integrally with the mount section. This may cause the pin provided on the main body section and the cam member to move relative to each other so that the pin engages the additional cam portion for opening the diaphragm larger than the minimum aperture.

The interchangeable lens of the construction as described above necessarily requires the body section and the mount section that move relative to each other upon mounting and detaching of the interchangeable lens to and from the camera body. The section including the cam member as well as the clutch member is also necessary. Thus, the interchangeable lens is extremely complicated in configuration. Also, it is practically impossible to modify a conventional interchangeable lens to employ therein the above construction because such modification requires drastic change of structure of the lens.

SUMMARY OF THE INVENTION

An object of this invention is to provide a kind of attachment device which is attachable to an interchangeable optical device having a diaphragm mechanism with the stopping-down tendency and which can solve the above mentioned problems by a simple construction.

Another object of the present invention is to provide an attachment device which has the above described features and which can also serve as a protective cap for the interchangeable optical device.

To accomplish these objects, an attachment device of the present invention is provided with a body portion attachable to an interchangeable optical device of the above described type and a diaphram restraining member which is provided on the body portion. When the body portion is attached to the interchangeable optical device, the diaphragm restraining member engages a diaphragm interlocked member of a diaphragm mechanism of the interchangeable optical device and moves the same to a position for opening the diaphragm larger than the minimum aperture. A click member may be provided for confirming the attachment device in a specific position with respect to the interchangeable optical device. The body portion may be provided with a mount portion to be mounted on a rear portion of the interchangeable optical device from which the diaphragm interlocked member extends and a protective cap portion for covering the back of the interchangeable optical device. The mount portion and the protective cap portion may be formed either integrally with or separately from one another.

With the attachment device of the present invention, the diaphragm restraining member can restrain the diaphragm at its open condition where an aperture larger than the minimum aperture is formed, whereby the above described problems caused by vigorous interference of the diaphragm blades at the minimum aperture setting are readily solved. Additionally, the construction of the attachment device itself is simple and it also does not complicate the construction of the interchangeable optical device.

The above and other objects, features and advantages of the present invention will become more apparent from the following description of the preferred embodiment taken in conjunction with the accompanying drawing.

DESCRIPTION OF PREFERRED EMBODIMENTS

Figure 1:
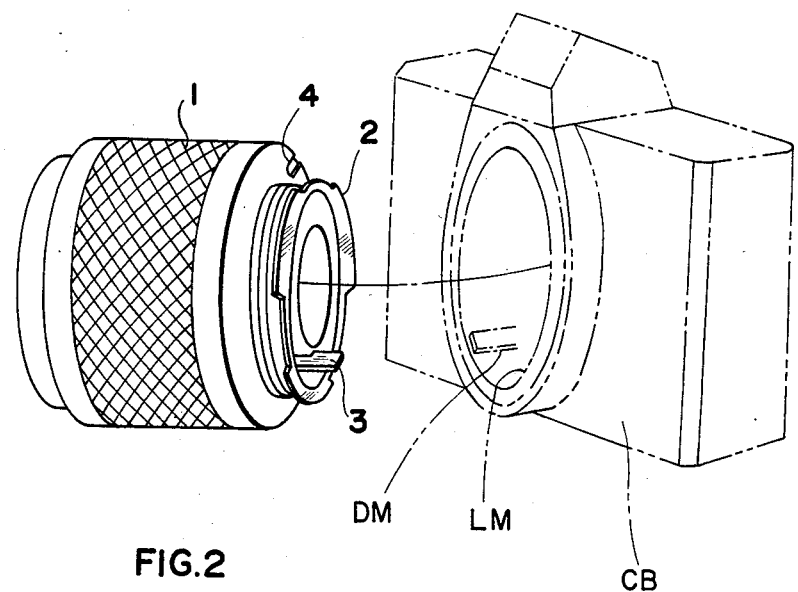
FIG. 1 is an external perspective view of an interchangeable lens.
Figure 2:
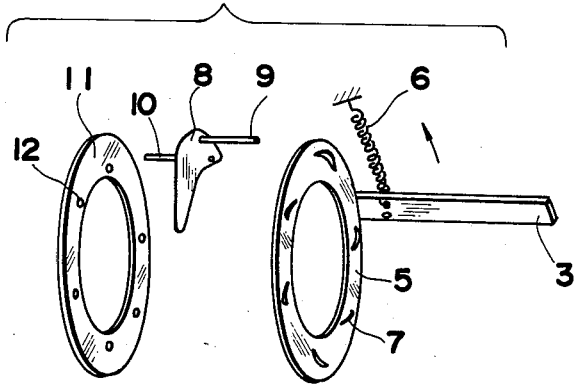
FIG. 2 is an exploded perspective view of the principal parts of the diaphragm mechanism in the interchangeable lens shown in FIG. 1.
Figure 3:
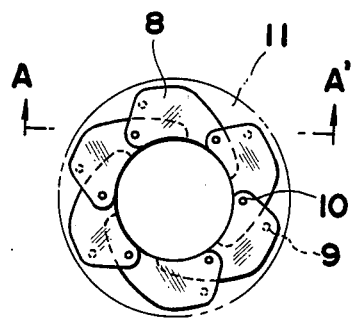
FIG. 3 is a front view of the principal parts of the diaphragm mechanism shown in FIG. 2, showing its full aperture state.
Figure 4:
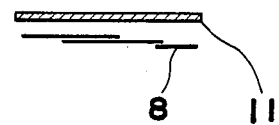
FIG. 4 is a cross-sectional view of the diaphragm mechanism taken along line A—A' of FIG. 3.
Figure 5:
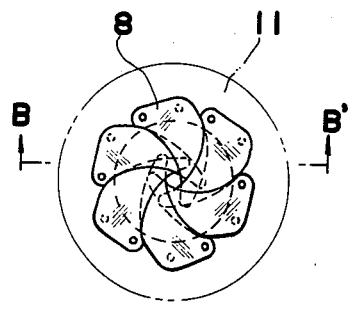
FIG. 5 is a front view of the principal parts of the diaphragm mechanism in FIG. 2, showing its minimum aperture state.
Figure 6:
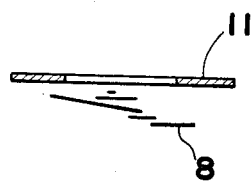
FIG. 6 is a cross-sectional view of the diaphragm mechanism taken along line B—B' of FIG. 5.

An interchangeable lens 1 shown in FIG. 1 has a male bayonet 2 at it back for the coupling with a camera body. A diaphragm interlocked member 3 is provided near the male bayonet 2 to be driven by a diaphragm driving member DM provided in the camera body CB when the interchangeable lens is mounted on the camera body CB. The interlocked member 3 is interlocked with the diaphragm mechanism of the interchangeable lens 1 in the manner illustrated in FIG. 2. As previously described, the diaphragm mechanism has the stopping-down tendency, and assumes the minimum aperture condition when the interchangeable lens is not coupled with any member. Also, as shown in FIG. 2 the diaphragm interlocked member 3 is urged in the clockwise direction as viewed from the front of the camera (the left side in FIGS. 1 and 2) and the diaphragm will open when the diaphragm interlocked member 3 is driven counterclockwise against the urging force.

When the interchangeable lens 1 is mounted on the camera body CB a locking dent 4 receives a locking pin (not shown) on the camera body CB to confine the interchangeable lens 1 at a specific position such that the diaphragm interlocked number 3 and a diaphragm driving member DM in the camera body CB and other member assume given relative positions and that unexpected rotation of interchangeable lens 1 so as to prevent the latter from coming off the camera.

Figure 7:
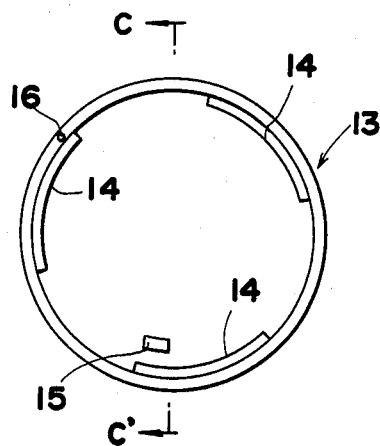
FIG. 7 is a front elevational view of an attachment device according to a first preferred embodiment of the present invention.
Figure 8:
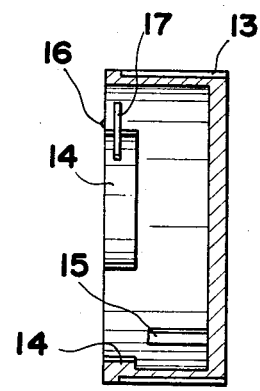
FIG. 8 is a cross-sectional view taken along line C—C' of FIG. 7.

FIGS. 7 and 8 show an attachment device 13 for the interchangeable lens according to the first embodiment of the present invention. The attachement device 13 is formed as a rear protective cap which is to be fit on the back of interchangeable lens 1 to cover the back and protect the male bayonet 2 formed on the mount portion of the interchangeable lens 1, diaphragm interlocked member 3, other mechanism and the lens rear surface. The attachment device 13 also prevents dust from entering the interchangeable lens mechanism. A female bayonet 14, which is adapted to engage the male bayonet 2 of the interchangeable lens 1, is formed on the attachment device 13. Also, a diaphragm retaining member 15 is formed on the inside bottom surface of the attachment device 13 so as to extend from the bottom surface at a right angle for engaging the diaphragm interlocked member 3 for the purpose of driving member 3 when the attachment device 13 is fit on the interchangeable lens 1. Further, a click projection 16 is integrally formed on the end plane of the attachment device 13 which abuts the back plane of the interchangeable lens 1. The click projection 16 protrudes from the peripheral edge of the attachment device. A slit 17 is formed slightly behind the projection such that the projection 16 can retract because of the resilient deformation of a slender part between the peripheral edge and the slit, and can also protrude by the resilient restoring force of the slender part.

Figure 9:
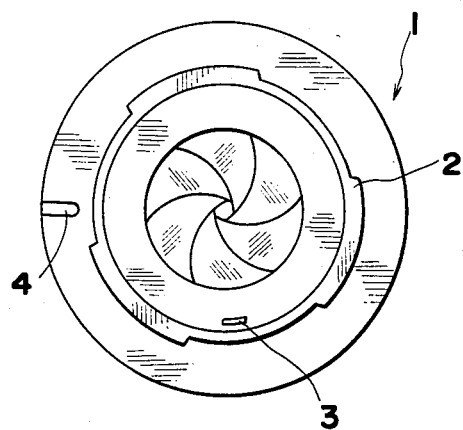
FIG. 9 is a front view of the interchangeable lens shown in FIG. 1.
Figure 10:
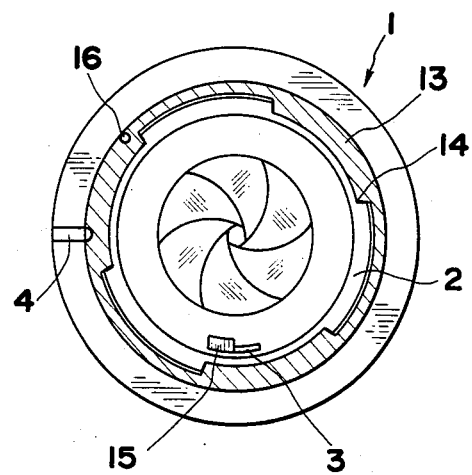
FIG. 10 is an explanatory illustration showing the state where the attachment device of the first embodiment is about to be mounted on the interchangeable lens.
Figure 11:
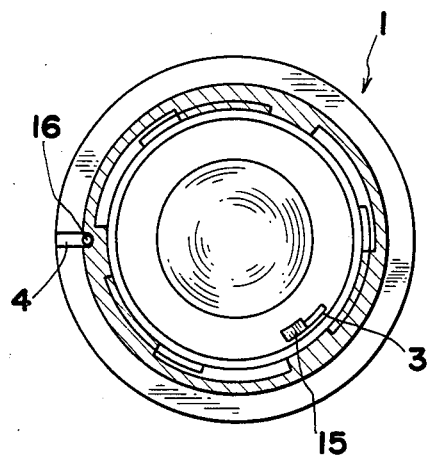
FIG. 11 is an explanatory illurstation showing the state where the attachment device of the first embodiment has been mounted on the interchangeable lens.

FIGS. 9 through 11 illustrate the relative position of the members when the interchangeable lens in FIG. 1 is viewed from its front. It should be noted that although the male bayonet 2, the diaphragm interlocked member 3 and locking dent 4 are actually not seen, they are shown by solid lines for the purpose of convenience of illustration. When the attachment device 13 is fit on the back of the interchangeable lens 1 to cover the back portion, the diaphragm retaining member 15 will come into engagement with diaphragm interlocked member 3 of the interchangeable lens 1, as shown in FIG. 10, or will be positioned in the vicinity of the member 3. At this time, the click projection 16 is pressed against the mount surface of interchangeable lens 1 and is in a withdrawn state because of the resilient deformation of the slender part formed by slit 17.

Next, if attachment device 13 is then rotated counterclockwise as viewed from the front of the interchangeable lens 1 in FIG. 10 the male bayonet 2 will be brought into engagement with female bayonet 14. The diaphragm interlocked member 3 is driven by the diaphragm retaining member 15 against the force of spring 16 and is rotated counterclockwise relative to the interchangeable lens 1, thereby opening the diaphragm. When the attachment device 13 is rotated by a prescribed angle, click projection 16 will come into alignment with the lock dent 4 formed on the mount surface of the interchangeable lens 1, and click projection 16 will engage the lock dent 4 by means of resilient restoring force of the deformed slender portion between the slit 17 and click projection 16 so attachment device 13 is locked against rotation.

At this time, as shown in FIG. 11, the diaphragm is fully opened irrespectively of the diaphragm value set by the diaphragm setting ring on the interchangeable lens 1. Even if the interchangeable lens is left in this condition for a long time, there will be no possibility that the overlapping diaphragm blades will be deformed, because only few diaphragm blades overlap each other. Neither will there be any possibility that the diaphragm blades will be injured while it is carried or that dust will be produced because of the paint on the surface of the diaphragm blades coming off.

Upon removal the attachment device 13 may be rotated clockwise as viewed from the front of the interchangeable lens 1, with a relatively strong force applied thereto. The click projection 16 will then disengage from the dent 4, retracting therefrom against the resilient force. Then the attachment device 13 may be rotated further clockwise.

It should be noted that if the attachment device 13 of the embodiment is formed of a transparent material, the interchangeable lens can be used as a magnifying lens in the condition during which the diaphragm of the interchangeable lens with the stopping-down tendency, at the full aperture state, is not coupled with the camera.

Figure 12:
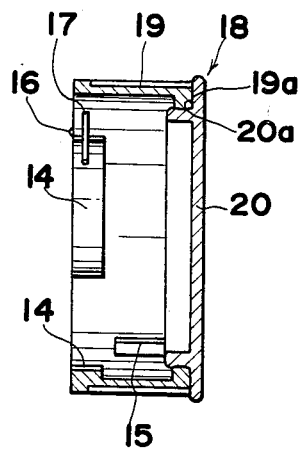
FIG. 12 is a cross-sectional view of an attachment device according to a second preferred embodiment of the present invention.
Figure 13:
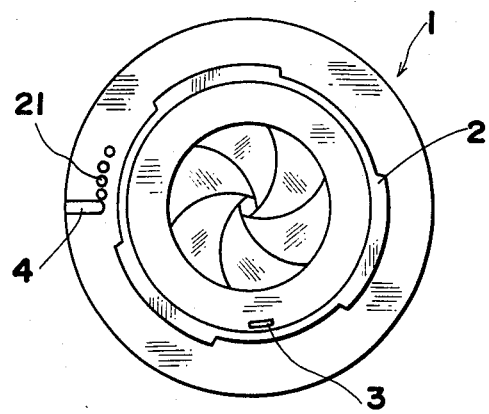
FIG. 13 is a front view of an interchangeable lens for use with the attachment device of the second embodiment.

FIGS. 12 and 13 show the second embodiment of the present invention. FIG. 12 shows an attachment device 18 and FIG. 13 an interchangeable lens viewed from its front as in FIG. 9. Although the structure of the attachment device of this second embodiment is almost the same as that of the first embodiment, the attachment device 18 of the second embodiment consists of two portions. One is a cylindrically shaped mount portion 19, and the other is a cap portion 20 which blocks the light passage from the lens. The two portions may be formed as separate parts.

The mount portion 19 is formed with a female bayonet 14, a diaphragm retaining member 15, a click projection 16, and a slit 17 which are similar to those of the first embodiment. At the rear of the inner wall is formed an annular elastic engaging portion 19a which extends radially to the center of the cylinder.

On the other hand, the cap portion 20 serves to cover the back of mount portion 19 to protect the lens surface and to prevent dust from entering the interchangeable lens. An annular elastic engaging portion 20a is formed on this cap portion 20. When the portion 20a is engaged with the elastic engaging portion 19a of the mount portion 19 from the back thereof, two portions 19 and 20 are coupled together to form a single unit.

The interchangeable lens 1 shown in FIG. 13 is provided with, in addition to locking dent 4, several click holes 21 in a circle about the optical axis of the lens. Those click holes are selectively engageable with the click projection 16 to determine at intervals the angular position of the attachment device 18 relative to the interchangeable lens and make it possible for the diaphragm retaining member 15 to determine at intervals the relative angular position of the diaphragm interlocked member 3, thereby selectively determining the diaphragm aperture value.

Namely, if the mount portion of the attachment device 18 is coupled with the cap portion 20 and then the attachment device 18 is rotated until the click projection 16 comes into engagement with the locking dent 4, the attachment device may serve as a rear protective cap similar to the one in the first embodiment. Also, if only cap portion 20 is removed therefrom the interchangeable lens may be used as a magnifying lens in a manner similar to the first embodiment of which attachment device is formed of a transparent material.

In addition to the protection of the diaphragm blades, the attachment device of the second embodiment may be associated with an interchangeable lens having no diaphragm setting ring such that manual diaphragm setting is possible with this type of interchangeable lens, (such an interchangeable lens is provided for automatic diaphragm control such that the position of the diaphragm interlocked member is automatically determined only from the side of a camera body). Namely, if the cap portion 20 is removed and the mount portion 19 attached to the interchangeable lens is rotated until the click projection 16 comes into engagement with any one of click holes 21, the diaphragm is manually set. This function may be especially effective at the time of reverse photography wherein the interchangeable lens 1 is reversely mounted on the camera body CB, i.e. its front end being connected with the camera body CB while its back being free.

It should be understood that in the second embodiment, the click holes 21 may be dispensed with but the locking dent 4 will suffice in the case when the diaphragm is not to be operated by the rotation of the attachment device.

The foregoing is the description about the preferred embodiments of this invention. In addtion to the above usage, the attachment device in accordance with this invention may be used for checking the trouble or malfuction of the diaphragm mechanism when the diaphragm interlocked member is arranged in a position not to be accessed by hand, in the interchangeable lens that has the diaphragm-opening tendency or that has no diaphragm setting ring. Although the trouble or malfunction of the diaphragm mechanism cannot be detected while the interchangeable lens is independent because the diaphragm mechanism of these interchangeable lenses cannot be operated unless they are mounted on the camera body, the attachment device of the present invention enables the operation of the diaphragm blades thereby enabling easy checking and detection of the trouble in the diaphragm mechanism.

In the foregoing description, the female bayonet for attaching the attachment device to the interchangeable optical device is formed integrally with the attachment device. This structure is favorable in respect of low manufacturing cost. To further ensure the connection of the attachment interchangeable lens with the device, the bayonet spring may be provided at the back of the female bayonet.

The projection for the click stop may not be formed integrally with the attachment device but may be composed of a solid steel ball embedded in some position of the attachment device where resiliency is provided by, for example, a slit, or the ball may be urged by a coil spring to project and retract.

Although the above described diaphragm retaining member is provided at a location for opening the diaphragm aperture fully when the attachment device is attached to an interchangeable optical device, the retaining member may be formed at any other location other than the full aperture attaining position so far as it achieves a considerably large aperture, because the diaphragm blades can be protected if the diaphragm aperture is not made smaller beyond the extent that the diaphragm blades vigorously interfere with one another.

The lock dent that prevents the rotation of the attachment device by receiving the click projection, was designed to restrict the rotation and the angular position of the interchangeable optical device when the interchangeable optical device is mounted on the camera. Thus, the dent also serves to prevent the interchangeable optical device from coming off by preventing rotation of the interchangeable optical device. Although this may be desirable from the view that no additional structure is required for the interchangeable optical device to be used with the attachment device of present invention, but needless to say, an exclusive groove may also be provided on the interchangeable optical device to receive the click projection of the attachment device. Also, the click projection is not necessarily limited to the structure of the above described embodiment. It may have any structure that engages a groove dent recess or projection formed on the interchangeable optical device.

The diaphragm interlocked member of the interchangeable optical device to be associated with the present invention is not necessarily limited to those that move in the circumferential direction in the plane normal to the optical axis of the optical system. As another example, a diaphragm interlocked member that moves along the optical axis may also be associated with the present invention. In this case, if the diaphragm interlocked member is urged to project toward the camera and the diaphragm blades are driven for stopping-down with this member being pushed in by force against the urging force, an oblique plane may be formed on the diaphragm retaining member of the attachment device such that the diaphragm interlocked member is pushed in by the oblique plane in accordance with the rotation of the attachment device.

Moreover, it is to be understood that the term "interchangeable optical device" is not limitedly used only to mean an interchangeable lens. Another example of the interchangeable optical device is a combination of an interchangeable lens and a device for close-up photography, such as an extension ring or an extension bellows, including means which is coupled with the diaphragm interlocked member of the interchangeable lens and which is driven by a driving member of a camera body to shift the diaphragm interlocked member of the interchangeable lens for stopping-down the diaphragm.

What is claimed is:

1. A lens rear cap for use with an interchangeable lens barrel which is attachable to a camera body, said lens barrel including a diaphragm mechanism having a plurality of diaphragm blades overlapping to form a diaphragm, and a diaphragm interlocked member interlocked with said diaphragm blades and urged in a direction to stop-down said diaphragm, said lens rear cap comprising a body portion attachable to said interchangbeable lens barrel and a diaphragm retaining member which is provided on said body portion and engageable with said diaphragm interlocked member to move the latter to a position for opening said diaphragm larger than the minimum aperature to be formed by said diaphragm, when said lens rear cap is attached to said interchangeable lens barrel.

2. A lens rear cap as defined in claim 1, further comprising a click member on said body portion for confining said body portion in a specific position with respect to said interchangeable lens barrel.

3. A lens rear cap as defined in claim 2, wherein said diaphragm retaining member is arranged in such a position to cause said diaphragm interlocked member to retain said diaphragm at its fully open condition when said body portion is in said specific position with respect to said interchangeable lens barrel.

4. A lens rear cap as defined in claim 1, wherein said body portion includes a mount portion to be mounted on a rear portion of said interchangeable lens barrel and a protective cap portion for covering the back of said interchangeable lens barrel.

5. A lens rear cap as defined in claim 4, wherein said mount portion and said protective cap portion are formed integrally with one another.

6. A lens rear cap as defined in claim 5, wherein said body portion is made of a transparent material.

7. A lens rear cap as defined in claim 4, wherein said mount portion and said protective cap portion comprise separate parts, and said protective cap portion is adapted to be detachably attached to said mount portion.

8. A lens rear cap as defined in claim 7, wherein said diaphragm retaining member extends from said body portion.

9. A lens rear cap as defined in claim 4, wherein said mount portion includes bayonet pawls engageable with corresponding bayonet pawls formed on said rear portion of said interchangeable lens barrel.

* * * * *